United States Patent
Nomura et al.

(10) Patent No.: US 6,694,752 B2
(45) Date of Patent: Feb. 24, 2004

(54) AUGER TYPE ICE MAKING MACHINE

(75) Inventors: Tomohito Nomura, Aichi-ken (JP); Yasuki Mizutani, Aichi-ken (JP); Hiroyuki Sugie, Aichi-ken (JP)

(73) Assignee: Hoshizaki Denki Kabushiki Kaisha, Toyoake (JP)

( * ) Notice: Subject to any disclaimer, the term of this patent is extended or adjusted under 35 U.S.C. 154(b) by 0 days.

(21) Appl. No.: 10/338,901

(22) Filed: Jan. 9, 2003

(65) Prior Publication Data
US 2003/0136136 A1 Jul. 24, 2003

(30) Foreign Application Priority Data
Jan. 18, 2002 (JP) ......................... 2002-010046

(51) Int. Cl.$^7$ ................................. E25C 1/14
(52) U.S. Cl. ........................... 62/136; 62/354
(58) Field of Search ................. 62/136, 196.1, 62/197, 354

(56) References Cited

U.S. PATENT DOCUMENTS

| | | | | |
|---|---|---|---|---|
| 3,449,920 A | * | 6/1969 | Van Steenburgh, Jr. | ....... 62/136 |
| 3,650,121 A | * | 3/1972 | Kimpel et al. | ................ 62/136 |
| 3,769,809 A | * | 11/1973 | Robinson et al. | ............. 62/137 |
| 4,426,851 A | * | 1/1984 | Neumann | ..................... 62/126 |
| 5,440,892 A | * | 8/1995 | Tatematsu et al. | ............ 62/135 |

\* cited by examiner

*Primary Examiner*—William E. Tapolcai
(74) *Attorney, Agent, or Firm*—Wenderoth, Lind & Ponack, L.L.P.

(57) ABSTRACT

A bypass passage is provided between a discharge pipe and a suction pipe of a compressor being a component of an auger type refrigeration circuit, for allowing a hot gas on the high-pressure side of the circuit to recirculate back to the low-pressure side. An electromagnetic valve is disposed on the bypass passage, and an ammeter is provided to a geared motor that drives an auger, which detects an overcurrent value indicative of an overload acting on the geared motor. In response to detection of an overcurrent value by the ammeter, the electromagnetic valve operates to allow a hot gas on the high-pressure side to be supplied to the low-pressure side through the bypass passage.

2 Claims, 6 Drawing Sheets

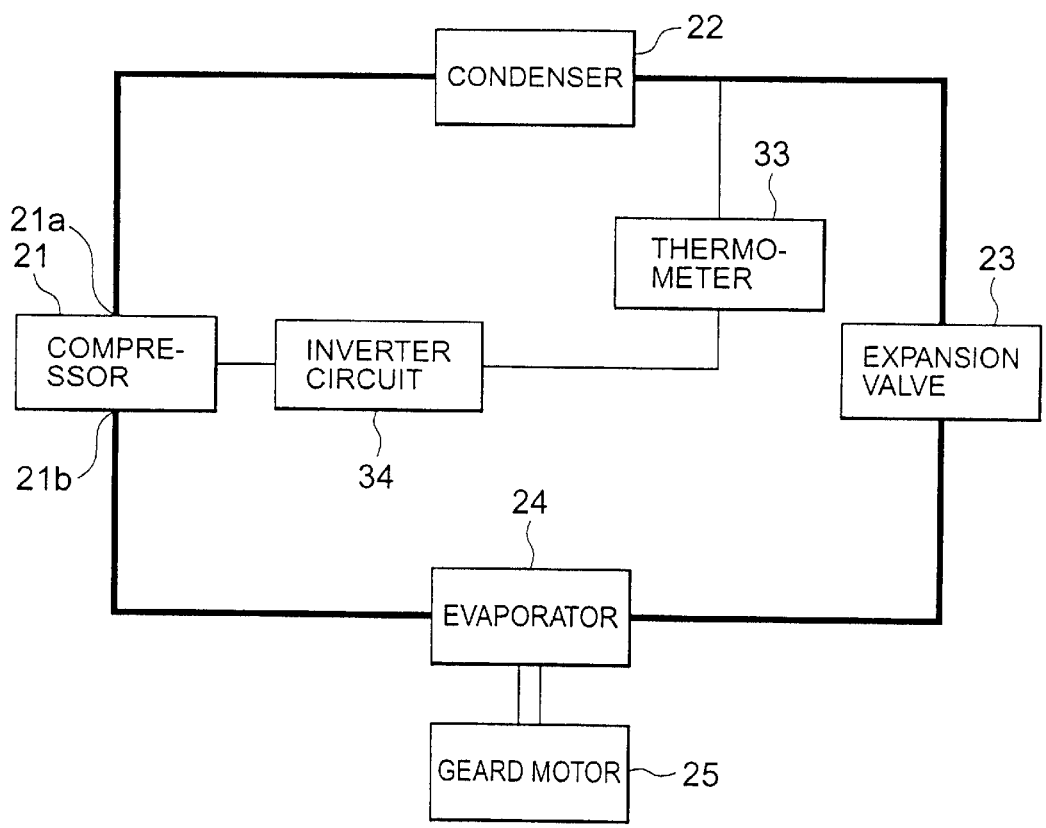

AUGER TYPE ICE MAKING MACHINE

BACKGROUND OF THE INVENTION

The present invention relates to an improved anti-locking system in an auger type ice making machine, which prevents a geared motor from being locked due to an occurrence of freeze-up in an evaporator of the auger type ice making machine.

DESCRIPTION OF THE RELATED ART

In an auger type ice making machine, a cooling evaporation tube (hereinafter also referred to as the "evaporator") is wound around an outer peripheral surface of a cylindrical refrigeration casing (hereinafter also referred to as the "cylinder"). Mounted within the cylinder is an auger disposed coaxially with, and rotatably around, the longitudinal axis of the cylinder. The auger has a helical blade formed thereon. On the other hand, water to be used for an ice making process (hereinafter referred to as the "water to be frozen") supplied into the cylinder from a supply pipe disposed in a lower part of the cylinder, is frozen into ice on an inner peripheral surface of the cylinder. The ice crystals thus formed are scraped off the cylinder inner surface by the helical blade of the auger that is rotationally driven by a gear motor, and are carried upward within the cylinder due to a feed-screw action, to be compressed by a compressing head and severed by a cutter to produce chipped ice.

However, ice making capacity of this auger type ice making machine is affected by such factors as ambient temperature and water temperature. Accordingly, generation of an abnormally large amount of ice within the cylinder may lead to a phenomenon in which the generated ice plugs the interior portion of the compressing head to cause locking of the gear motor that drives the helical blade. Various measures have been devised to prevent such a phenomenon.

One example of an auger type ice making machine adapted to overcome this problem is disclosed in JP 60-042567 A. As shown in FIG. 8, in the auger type ice making machine disclosed therein, an auger 3 having a helical blade formed thereon is mounted within a cylinder 1 such that it is rotationally driven by a driving apparatus 4 (motor). An evaporator 5 is wound around an outer peripheral surface of the cylinder 1. Refrigerant is supplied to this evaporator 5 from a refrigeration circuit composed of a compressor 6, a condenser 7, and an expansion valve 8, whereby the water to be frozen supplied from a supply pipe 9 is frozen into ice on the inner peripheral surface of the cylinder 1. A temperature sensing device 10 is disposed at the outlet of the evaporator 5. When the temperature sensing device 10 senses an impending occurrence of freeze-up due to an abrupt drop in the temperature within the evaporator 5, a three-way valve 11 is opened whereby a high-temperature refrigerant from the compressor 6 is introduced into the evaporator 5 through a bypass passage 12. Accordingly, the ice frozen in excess within the cylinder 1 is allowed to melt, thus preventing the driving apparatus 4 from being locked.

Further, in the case where a gas thermometer is used as the temperature sensing device 10 provided at the outlet of the evaporator 5 being on the low-pressure side, the temperature sensing device 10 judges, upon sensing the evaporator temperature, whether or not freeze-up is occurring within the evaporator 5 and an ice making operation is completely halted if freeze-up is judged to be occurring, thereby preventing the auger type ice making machine from being locked.

However, in the conventional ice making machine described above, a normal ice making operation is not performed while the high-temperature refrigerant is being introduced into the evaporator 5 though the bypass passage 12. That is, a normal ice making operation is temporarily halted during this period, which means that the ice making capacity of the machine is reduced by that much.

Further, even in the case where locking of the machine is prevented by use of a gas thermometer, a gas thermometer typically has a very poor responsiveness, and thus it takes a very long time to make a judgement that freeze-up has occurred. This often resulted in the ice making machine being broken before its operation is successfully stopped. Further, the ice making operation is brought into a complete halt once a freeze-up condition is judged to have occurred, creating a situation where there is no supply of ice until the ice making operation is resumed. Therefore, there was a problem in that the ice making capacity is considerably reduced also in this respect.

SUMMARY OF THE INVENTION

The present invention has been devised in order to solve the aforementioned problems. Therefore, an object thereof is to provide an anti-lock system for an auger type ice making machine, which prevents locking of the auger type ice making machine without stopping an ice making operation, that is, while maintaining ice making capacity of the machine.

In order to attaint the above object, according to the present invention, there is provided an auger type ice making machine which comprises: a refrigeration circuit provided with a compressor, a condenser, an expansion valve, and an evaporator; a cylinder having the evaporator wound around its outer peripheral surface; an auger rotatably mounted within the cylinder; a motor for rotationally driving the auger; precursor detecting means for detecting a precursor predictive of locking of the motor occurring due to freeze-up in the evaporator; and a bypass passage for bypassing refrigerant on the high-pressure side of the refrigeration circuit to the low-pressure side, in the case where the precursor detecting means has detected the precursor to locking of the motor.

Further, in order to attain the aforementioned object, according to another aspect of the present invention, there is provided an auger type ice making machine which comprises: a refrigeration circuit provided with a compressor, a condenser, an expansion valve, and an evaporator; a cylinder having the evaporator wound around its outer peripheral surface; an auger mounted rotatably within the cylinder; a motor for rotationally driving the auger; precursor detecting means for detecting a precursor to locking of the motor occurring due to freeze-up in the evaporator; and condenser capacity adjusting means for reducing condensation capacity of the condenser, in the case where the precursor detecting means has detected the precursor to locking of the motor.

Further, in order to attain the aforementioned object, according to yet another aspect of the present invention, there is provided an auger type ice making machine which comprises: a refrigeration circuit provided with a compressor, a condenser, an expansion valve, and an evaporator; a cylinder having the evaporator wound around its outer peripheral surface; an auger rotatably mounted in the cylinder; a motor for rotationally driving the auger; precursor detecting means for detecting a precursor to locking of the motor occurring due to freeze-up in the evaporator; and compressor capacity adjusting means for reducing compression capacity of the compressor, in the case where the precursor detecting means has detected the precursor to locking of the motor.

The precursor detecting means may determine that there exists a precursor to locking of the motor upon detecting one of the following: a drive current of the motor becomes equal to or greater than a threshold; one of an outlet temperature and an outlet pressure of the evaporator becomes equal to or lower than a threshold; and one of an outlet temperature and an outlet pressure of the condenser becomes equal to or lower than a threshold.

DESCRIPTION OF THE PREFERRED EMBODIMENTS

Embodiment 1

Figure 1:
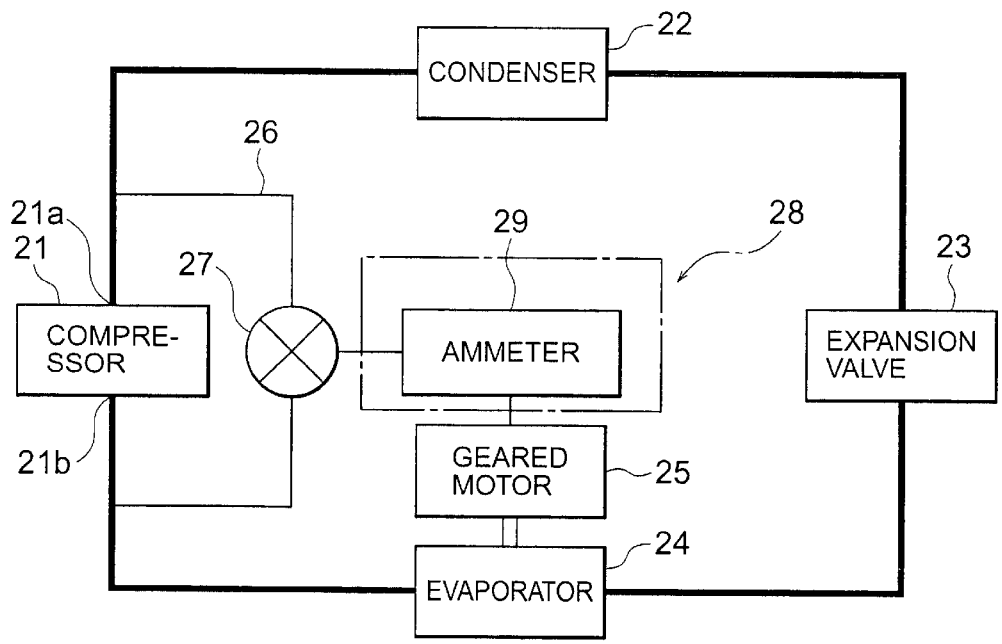
FIGS. 1 to 7 are circuit diagrams showing a refrigeration circuit of an auger type ice making machine in accordance with Embodiments 1 through 7 of the present invention, respectively.

Hereinbelow, the present invention will be described in detail based on Embodiment 1 of the invention shown in FIG. 1. FIG. 1 shows a refrigeration circuit for supplying refrigerant to an evaporator.

Shown in the drawing are a compressor 21, a condenser 22, an expansion valve 23, an evaporator 24, and a geared motor 25 for driving an auger of an auger type ice making machine. Reference numeral 26 denotes a bypass passage formed of a capillary tube, which communicates a refrigerant outlet port 21a (discharge pipe) of the compressor 21 with a refrigerant inlet port 21b (suction pipe) thereof. Reference numeral 27 denotes an electromagnetic valve disposed on the bypass passage 26. When the electromagnetic 27 is opened, a hot gas on the high-pressure (the discharge pipe) side which is discharged from the refrigerant outlet port 21a is bypassed to the low-pressure (the suction pipe) side being the refrigerant inlet port 21b side.

Reference numeral 28 denotes a lock control unit composed of an ammeter 29 connected to wiring of the geared motor 25 and a relay circuit (not shown) connected to the ammeter 29. In order to detect a precursor to locking of the geared motor 25, the ammeter 29 as precursor detecting means constantly detects a torque acting on the auger by continuously detecting a drive current of the geared motor 25. The ammeter 29 operates cooperatively with the electromagnetic valve 27, and a threshold value for determining an occurrence of overload beyond design limits is set therefor. The magnetic valve 27 is opened when the ammeter 29 detects a drive current that is equal to or greater than this threshold; otherwise, the magnetic valve 27 normally remains closed to prevent ice making capacity from decreasing.

In accordance with Embodiment 1, since there is an univocal relationship between a rotational torque and a drive current value of the geared motor 25, it is possible to detect a torque acting on the auger at all times by constantly detecting a current value indicated by the ammeter 29.

Accordingly, when the ammeter 29 detects an overload current that is equal to or greater than the threshold, the lock control unit 28 operates to open the electromagnetic valve 28, whereby a hot gas on the high-temperature side discharged from the compressor 21 is bypassed and recirculates back to the low-pressure side. Accordingly, pressure on the low-pressure side increases to cause a rise in evaporation temperature, thereby making it possible to limit the ice making capacity.

An overload condition occurs as a consistent precursor to the onset of freeze-up in the evaporator 24. Accordingly, an overcurrent flows to the geared motor 25, whereby the lock control unit 28 operates to prevent locking of the auger type ice making machine.

Further, an overcurrent also flows to the geared motor in other situations where an overload condition occurs, such as when starting or resuming operation of the machine. In such a case, the lock control unit 28 similarly operates to prevent a locking phenomenon.

As described above, in the event of an abnormality such as when the ammeter 29 detects a current value that is equal to or greater than the threshold, a control is performed to progressively reduce the ice making capacity, whereby the ice making machine can be protected without stopping an ice making operation. Moreover, the control can be performed with excellent responsiveness by relying on current value detection in achieving the control. Further, the electromagnetic valve 27 remains closed during a normal operation process to prevent the ice making capacity from decreasing.

Embodiment 2

Embodiment 2 of the present invention will be described in detail with reference to FIG. 2. Note that like parts as described in Embodiment 1 are denoted by like reference numerals used in FIG. 1.

Features of Embodiment 2 are given as below. That is, directing attention to the fact that there is a close relationship between a state inside the evaporator 24 and an outlet temperature thereof, a thermistor thermometer 30 having excellent responsiveness is disposed as precursor detecting means at the outlet of the evaporator 24 and opening/closing of the electromagnetic valve 27 is controlled by inputting to a micro computer (hereinafter also referred to as the "micon") 31 a temperature signal detected by the thermistor thermometer 30. Accordingly, when ice making capacity is excessive or when a freeze-up condition occurs, the temperature decreases due to an inability to attain sufficient heat. Then, by constantly detecting an outlet temperature of the evaporator 24 with the thermistor thermometer 30, a load acting on the auger can be constantly detected.

Figure 2:
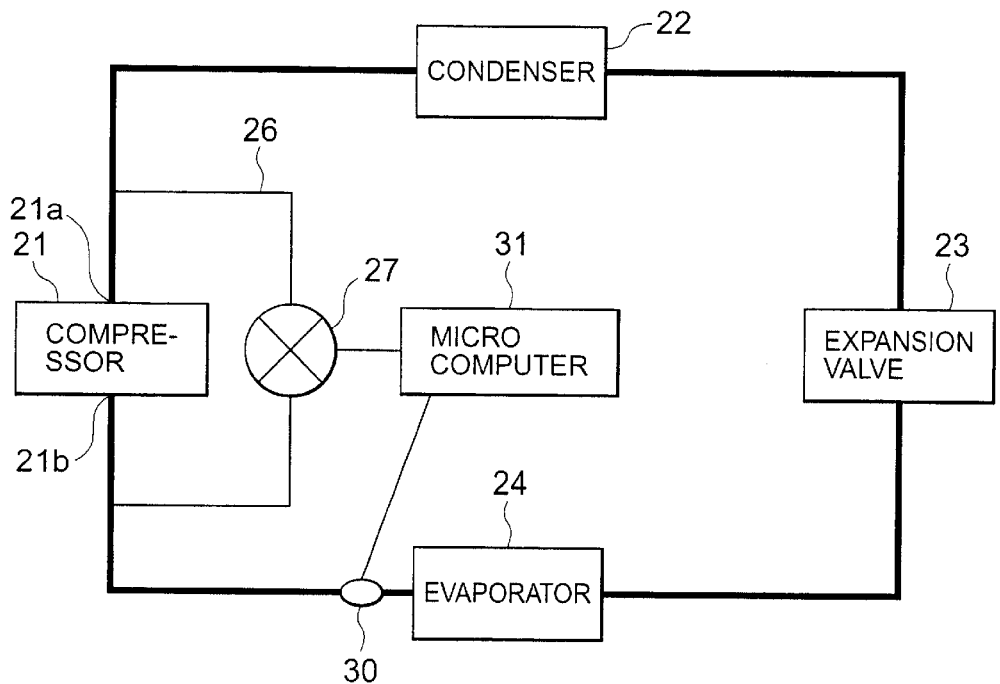

In view of the above, an outlet temperature of the evaporator 24 is detected by the thermistor thermometer 30 having excellent responsiveness, as in a refrigeration circuit shown in FIG. 2. The micon 31 as a lock control unit operates cooperatively with the electromagnetic valve 27 operating to open/close the bypass passage 26 formed of a capillary tube, and is connected by means of a relay circuit (not shown). A threshold value is set for the outlet temperature of the evaporator for determination of an overload condition beyond design limits. When an outlet temperature equal to or greater than this threshold is detected, the electromagnetic valve 27 is opened to bypass a hot gas on the high-pressure (discharge pipe) side to the low-pressure (suction pipe) side.

In accordance with Embodiment 2, when the thermistor thermometer 30 detects an outlet temperature that is equal to or below the threshold, the electromagnetic valve 27 opens based on a signal that is controlled by the micon 31, whereby the pressure on the low-pressure side increases to cause a rise in evaporation temperature, thereby making it possible to limit the ice making capacity. Further, a drop in the outlet temperature of the evaporator 24 always occurs as a consistent precursor to the onset of freeze-up in the evaporator 24. An abrupt drop in temperature also occurs when starting or resuming operation of the machine. In the event of such an abnormality, the ice making capacity of the machine is progressively reduced, whereby locking of the machine can be prevented without stopping an ice making operation, to thereby protect the machine. Moreover, the above control can be preformed with excellent responsiveness by detecting the outlet temperature of the evaporator with the thermistor thermometer 30. Note that the electromagnetic valve 27 remains closed during a normal operation process, thus preventing the ice making capacity from decreasing.

Embodiment 3

Figure 3:
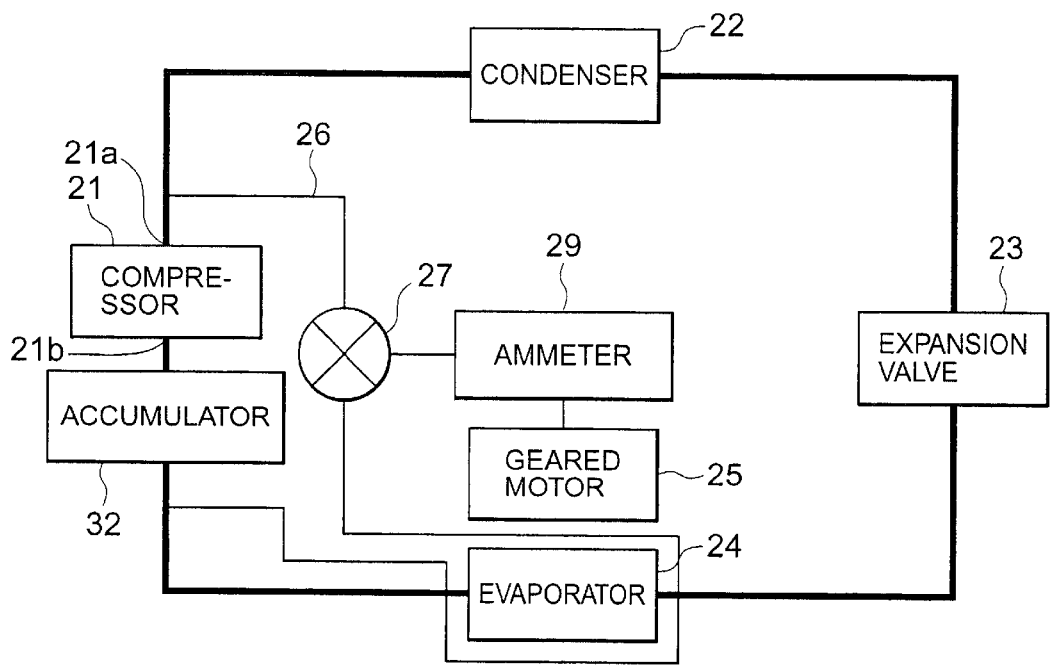

Embodiment 3 of the present invention will be described in detail based on FIG. 3. In Embodiment 3, as in the case of Embodiment 1, attention is directed to the fact that there is an univocal relationship between a rotational torque and a drive current value of the geared motor. That is, an ammeter 29 as precursor detecting means is connected to the wiring of the geared motor 25 opposing the ammeter 29. Thus, the ammeter 29 detects a drive current of the geared motor 25 constantly, which is to say that a torque acting on the auger is constantly detected. As shown in the refrigeration circuit of FIG. 3, the ammeter 29 operates cooperatively with an electromagnetic valve 27 acting to open/close a bypass passage 26 formed of a capillary tube, and is connected by means of a relay circuit (not shown). A threshold value is set for the drive current which is determined as an overload current beyond design limits. When a drive current equal to or greater than this threshold is detected, the electromagnetic valve 27 is opened to bypass a hot gas on the high-pressure (discharge pipe) side to the low-pressure (suction pipe) side. Accordingly, the pressure on the low-pressure side increases to cause a rise in evaporation temperature, thereby limiting the ice making capacity. Further, the bypass passage 26 is formed to take such a course as to contact the evaporator 24 on the midway. This arrangement allows the limiting of the ice making capacity to be effected also by utilizing heat from the hot gas. In this case, considering a potentiality of a liquid back phenomenon, it is required to connect the accumulator 32 in front of the compressor 21.

According to Embodiment 3, an overload condition occurs as a consistent precursor to the onset of freeze-up in the evaporator 24, whereby an overcurrent flows to the geared motor. Further, an overcurrent also flows to the geared motor in other situations where an overload condition occurs, such as when starting or resuming operation of the machine. In the event of such an abnormality, the ice making capacity of the ice making machine is progressively reduced in two-staged control, whereby the machine can be protected without stopping operation thereof. Moreover, the above control can be performed with excellent responsiveness by relying on a current value detection in achieving the control. The electromagnetic valve 27 is closed during a normal operation process, thus preventing the ice making capacity from decreasing.

Embodiment 4

Figure 4:
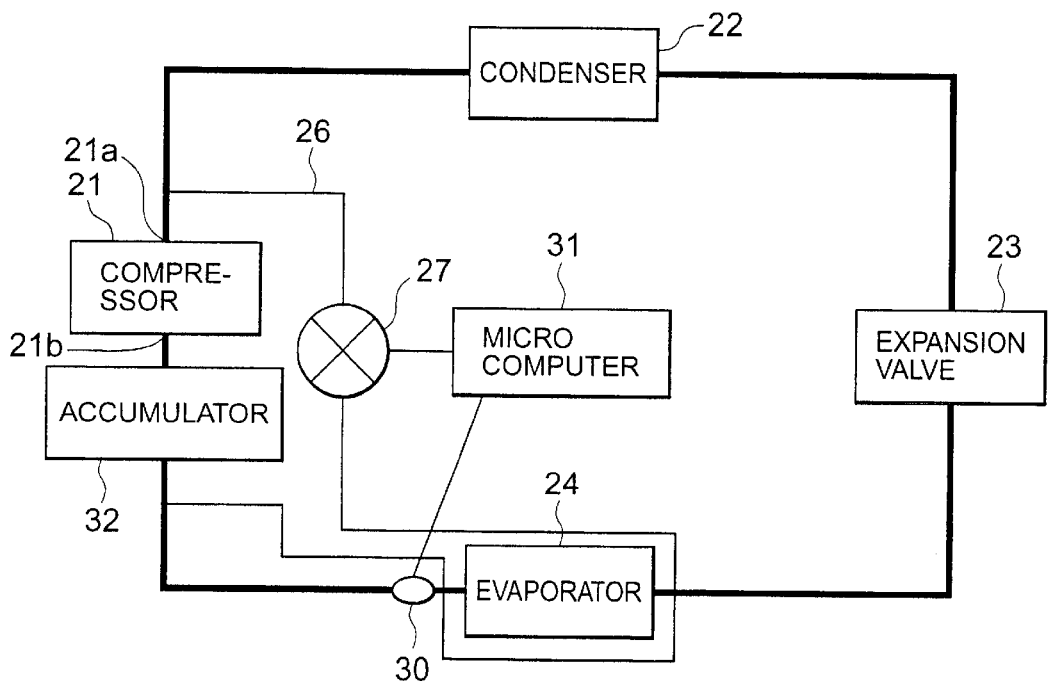

Embodiment 4 of the present invention will be described in detail based on FIG. 4. Here, as in the case of Embodiment 2, attention is directed to the fact that there is a close relationship between the state inside the evaporator and the outlet temperature thereof. That is, in the arrangement shown in FIG. 4, excessive ice making capacity or an occurrence of a freeze-up condition causes the temperature to drop due to an inability to attain sufficient heat. On the other hand, an outlet temperature of the evaporator is detected at all times, thus constantly detecting a load acting on the auger. As shown in a refrigeration circuit of FIG. 4, a thermistor thermometer 30 having excellent responsiveness is disposed as precursor detecting means at the outlet of the evaporator 24 to thereby detect an outlet temperature thereof. A micon 31 operates cooperatively with an electromagnetic valve 27 serving as a plug for a bypass passage 26 formed of a capillary tube, and is connected by means of a relay circuit (not shown). A threshold value is set for the outlet temperature of the evaporator 24 for determination of an overload temperature beyond design limits. When an outlet temperature equal to or below this threshold is detected, the electromagnetic valve 27 is opened to bypass a hot gas on the high-pressure (discharge pipe) side to the low-pressure (suction pipe) side. Accordingly, the pressure on the low-pressure side increases to cause a rise in evaporation temperature, thereby limiting the ice making capacity of the machine. Further, the bypass passage 26 is formed to take such a course as to contact the evaporator 24 on the midway. This arrangement allows limiting of the ice making capacity to be effected also by utilizing heat from the hot gas. In this case, considering a potentiality of a liquid back phenomenon, it is required to connect an accumulator 32 in front of the compressor 21.

According to Embodiment 4 of the present invention, a drop in temperature always occurs as a consistent precursor predictive of an occurrence of freeze-up in the evaporator 24. Also, an abrupt drop in temperature also occurs upon starting or resuming operation of the machine. In the event of such abnormalities, the ice making capacity of the machine is progressively reduced in two-staged fashion, whereby the machine can be protected without stopping an ice making operation. Further, use of the thermistor thermometer 30 to detect an outlet temperature of the evaporator enables the above control to be performed with excellent responsiveness. The electromagnetic valve 27 remains closed during a normal operation process, thus preventing the ice making capacity from decreasing.

Embodiment 5

Embodiment 5 of the present invention will be described in detail based on FIG. 5. It is to be noted that like reference numerals used in FIG. 1 are used to denote like parts described in Embodiment 1.

Figure 5:
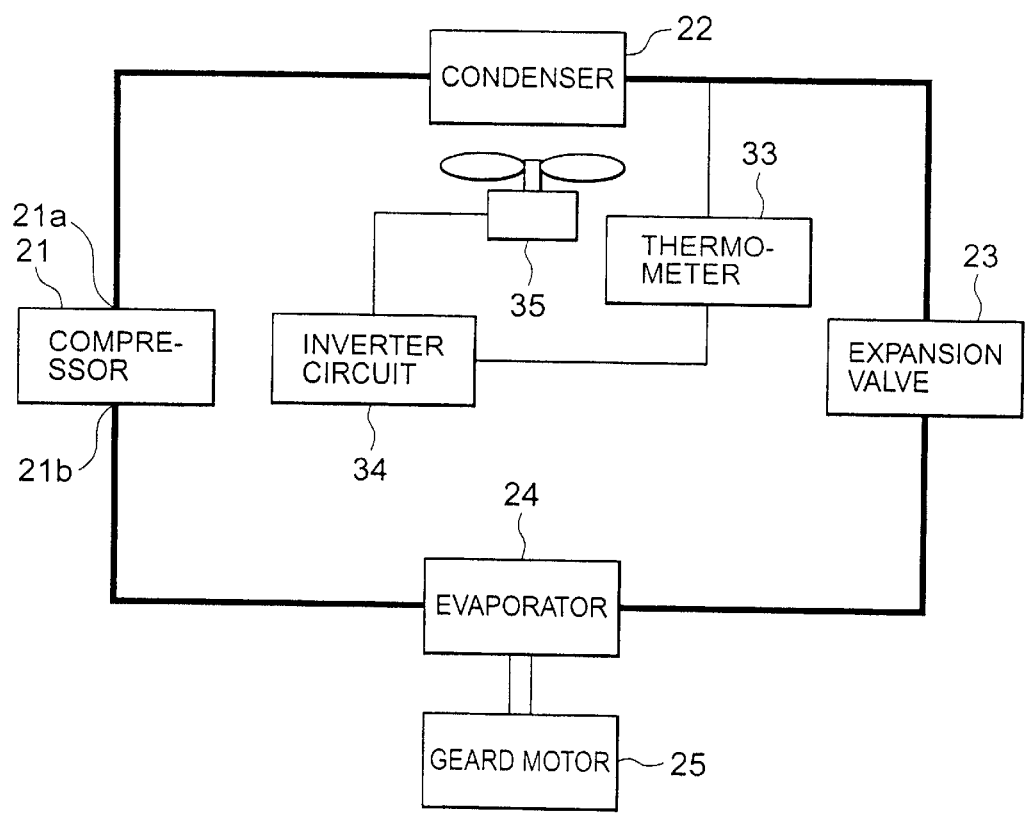

As shown in FIG. 5, in Embodiment 5, a thermometer 33 is disposed on the refrigerant outlet side of a condenser 22 in a refrigeration circuit. The thermometer 33 is connected to a condenser fan 35 via an inverter circuit 34. The condenser fan 35 may be the one normally provided in association with the condenser 22 in the refrigeration circuit for the purpose of cooling the condenser 22.

Generally, as a precursor to the onset of freeze-up in the evaporator 24, there occurs a drop in temperature and pressure of refrigerant within the evaporator 24. At the same time, temperature and pressure of refrigerant within the condenser 22 also decrease because the refrigerant remains concentrated on the low-pressure side. That is, there occurs a drop in the outlet temperature and the outlet pressure of both the condenser 22 and the evaporator 24 as a precursor to the onset of freeze-up in the evaporator 24. Thus, a thermometer or a manometer is disposed at the outlet of the evaporator 24 or the condenser 22 to detect the outlet temperature or the outlet pressure at all times, whereby it becomes possible to monitor whether or not there exits a precursor predictive of an occurrence of freeze-up in the evaporator 24.

Accordingly, in Embodiment 5 the thermometer 33 is disposed as precursor detecting means on the outlet side of the condenser 22 to thereby detect a precursor predictive of locking of the geared motor due to freeze-up in the evaporator. When a precursor to the onset of a freeze-up condition is detected, in order to avoid locking of the geared motor 25 due to the freeze-up condition, the ice making capacity of the machine is progressively reduced to prevent the geared motor 25 from being locked. The manner in which this control is performed will be explained hereinbelow.

The thermometer 33 reads an outlet temperature of the condenser 22 at all times. In a case where the thermometer 33 reads an outlet temperature that is equal to or below a threshold, that is, when it is judged that there has appeared a precursor predictive of freeze-up in the evaporator 24, the thermometer 33 transmits a signal to the inverter circuit 34. Upon receiving the signal indicating the appearance of a precursor predictive of freeze-up, the inverter circuit 34 controls the condenser fan 35 to reduce the rotation speed thereof or to stop its rotation. That is, the condenser fan 35 controlled as described above functions as condenser capacity adjusting means for reducing condensation capacity of the condenser. When the rotation speed of the condenser fan 35 is reduced or the rotation thereof is stopped, the condensation capacity of the condenser 22 is reduced, resulting in reduced refrigeration capacity of the refrigeration circuit. Therefore, excessive cooling of the evaporator 24 can be prevented, whereby a load imposed on the ice making machine is reduced so that locking of the geared motor 25 or the auger rotationally driven by the geared motor 25 can be avoided at a relatively early stage.

That is, according to Embodiment 5, the outlet temperature of the condenser 22 is constantly detected, whereby an overload condition in the evaporator 24 can be detected before freeze-up takes place in the evaporator 24. Therefore, a load imposed on the ice making machine is reduced as compared with a case where the machine is stopped after detecting a lock condition. Moreover, the above control can be performed without stopping the ice making machine, thus allowing a continuous ice making operation.

Embodiment 6

Figure 6:
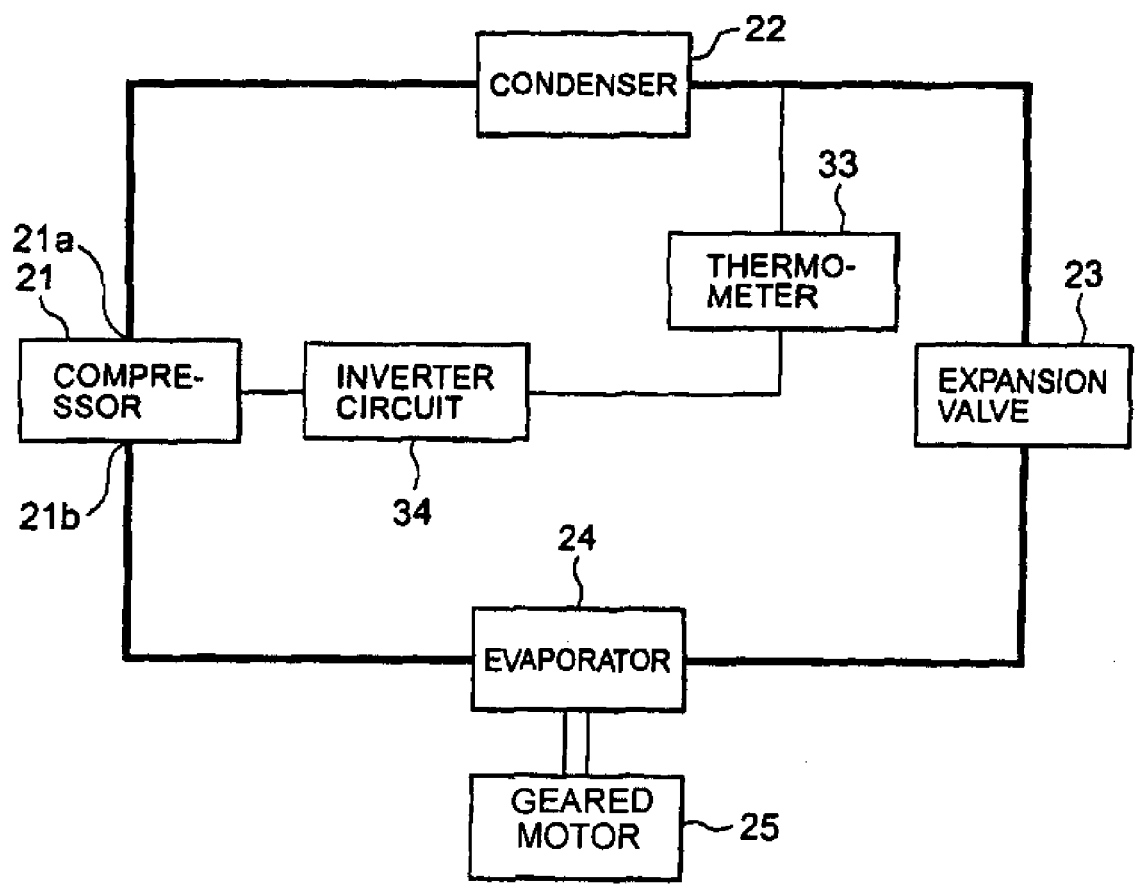
Figure 7:
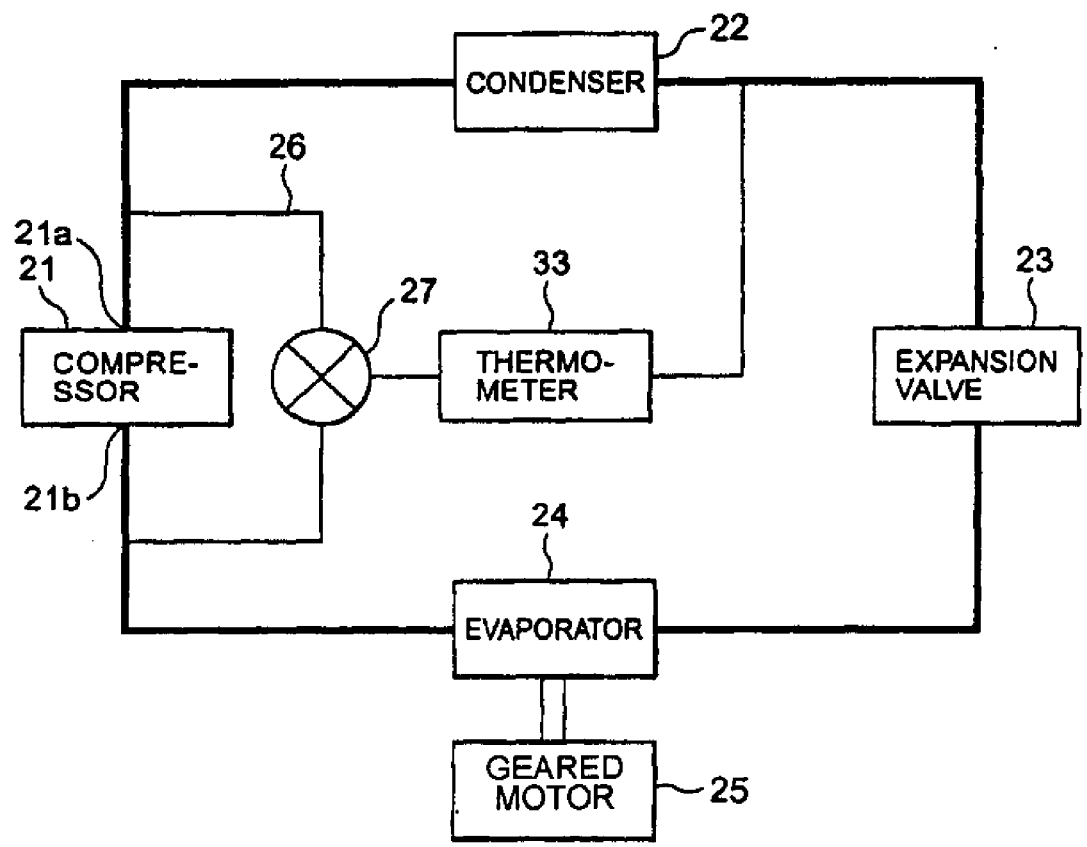
Figure 5:
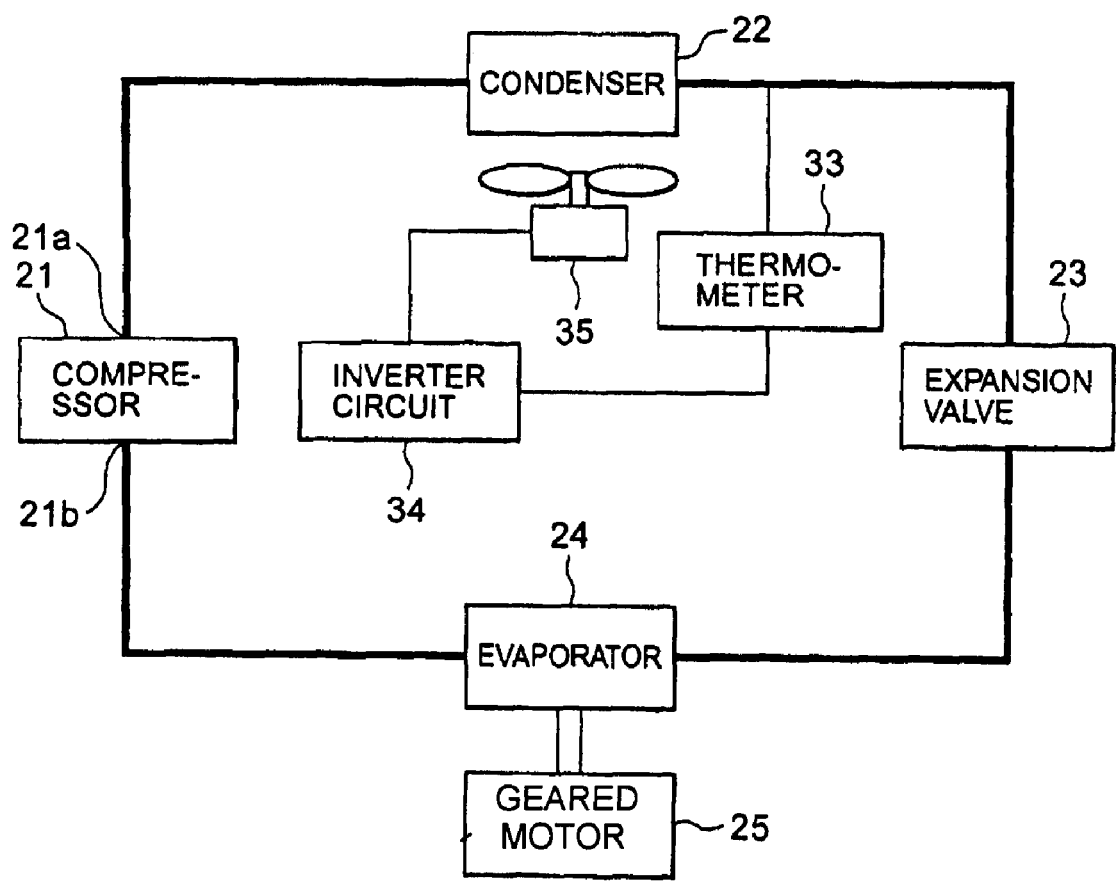
Figure 6:
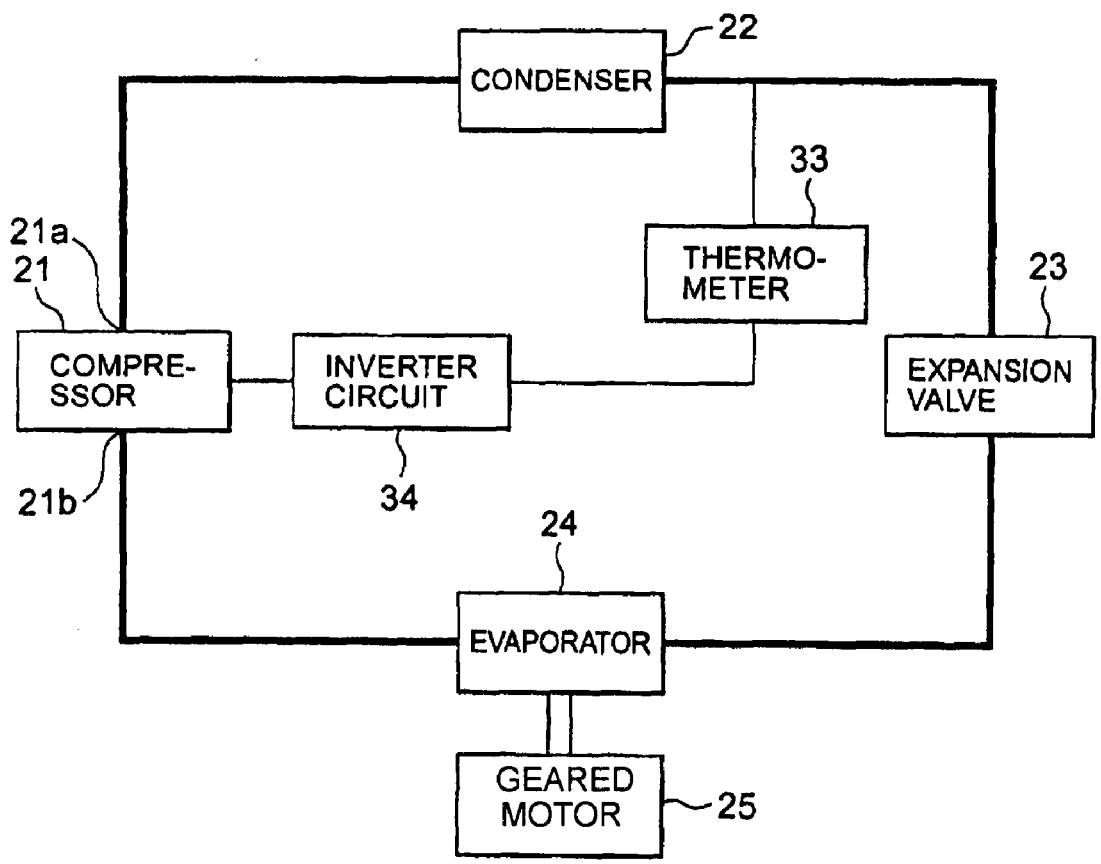
Figure 7:
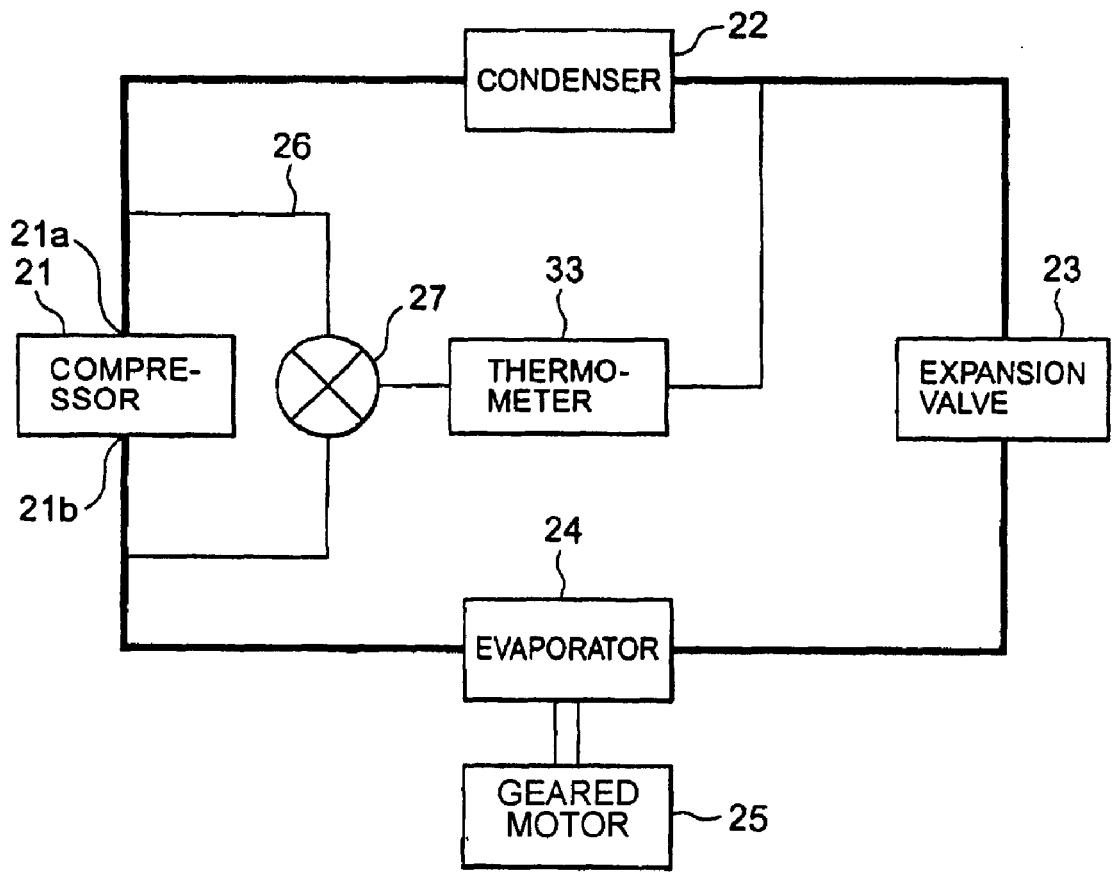

According to Embodiment 6 of the prevent invention, instead of controlling the rotation speed of the condenser fan as in the case of Embodiment 5, rotation speed of the compressor is controlled. That is, in Embodiment 6, as shown in FIG. 6 there is provided a thermometer 33 as precursor detecting means, for detecting an outlet temperature of a condenser 22. The thermometer 33 is connected to a compressor 21 via an inverter circuit 34 functioning as compressor drive controlling means.

The thermometer 33 reads the outlet temperature of the condenser 22 at all times. When the thermometer 33 reads an outlet temperature that is equal to or below a threshold, that is, when it is judged that a precursor predictive of freeze-up has appeared in the evaporator 24, the thermometer 33 transmits a signal to the inverter circuit 34. Upon receiving the signal indicating the appearance of a precursor predictive of freeze-up from the thermometer 33, the inverter circuit 34 controls the compressor 21 to reduce the rotation speed thereof or to stop its rotation. That is, the inverter circuit 34 functions as compressor capacity adjusting means for reducing the compressive capacity of the compressor. When the rotation speed of the compressor 21 is reduced or the rotation thereof is stopped, an amount of refrigerant circulating through the refrigeration circuit decreases, whereby refrigeration capacity of the refrigeration circuit is reduced. Accordingly, it becomes possible to prevent the evaporator 24 from being cooled in excess, whereby a load imposed on the ice making machine can be reduced so that locking of the geared motor 25 or the auger rotationally driven by the geared motor 25 can be avoided at a relatively early stage.

As described above, an overload condition in the evaporator is detected, whereby excessive cooling of the evaporator can be suppressed before freeze-up of the evaporator takes place. Therefore, it is possible to reduce a load imposed on the ice making machine as compared with a case where the machine is stopped after detecting a lock condition. Further, the above control is performed without stopping the ice making machine, thus allowing a continuous ice making operation. Moreover, there is an additional advantage that saving can be achieved in terms of power consumption because the control is effected by lowering the compressor output, as compared with a method in which control of an overload condition is effected by warming an ice making unit with a heater.

Embodiment 7

Figure 7:
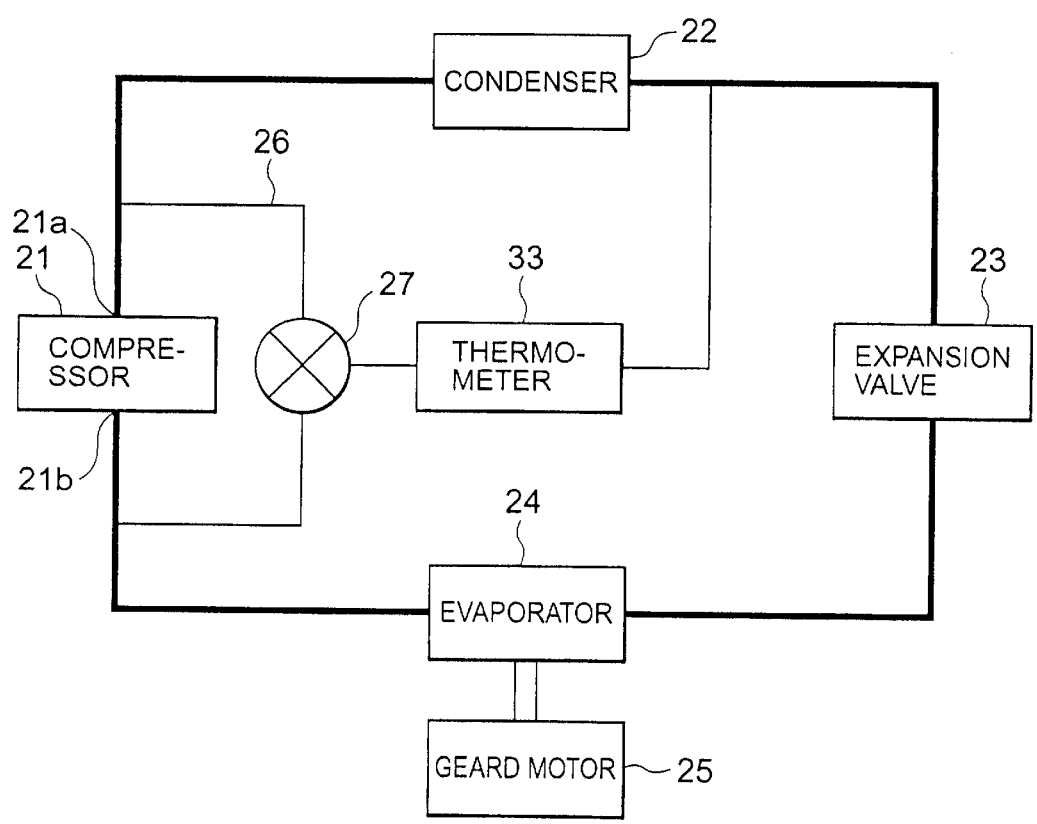
Figure 8:
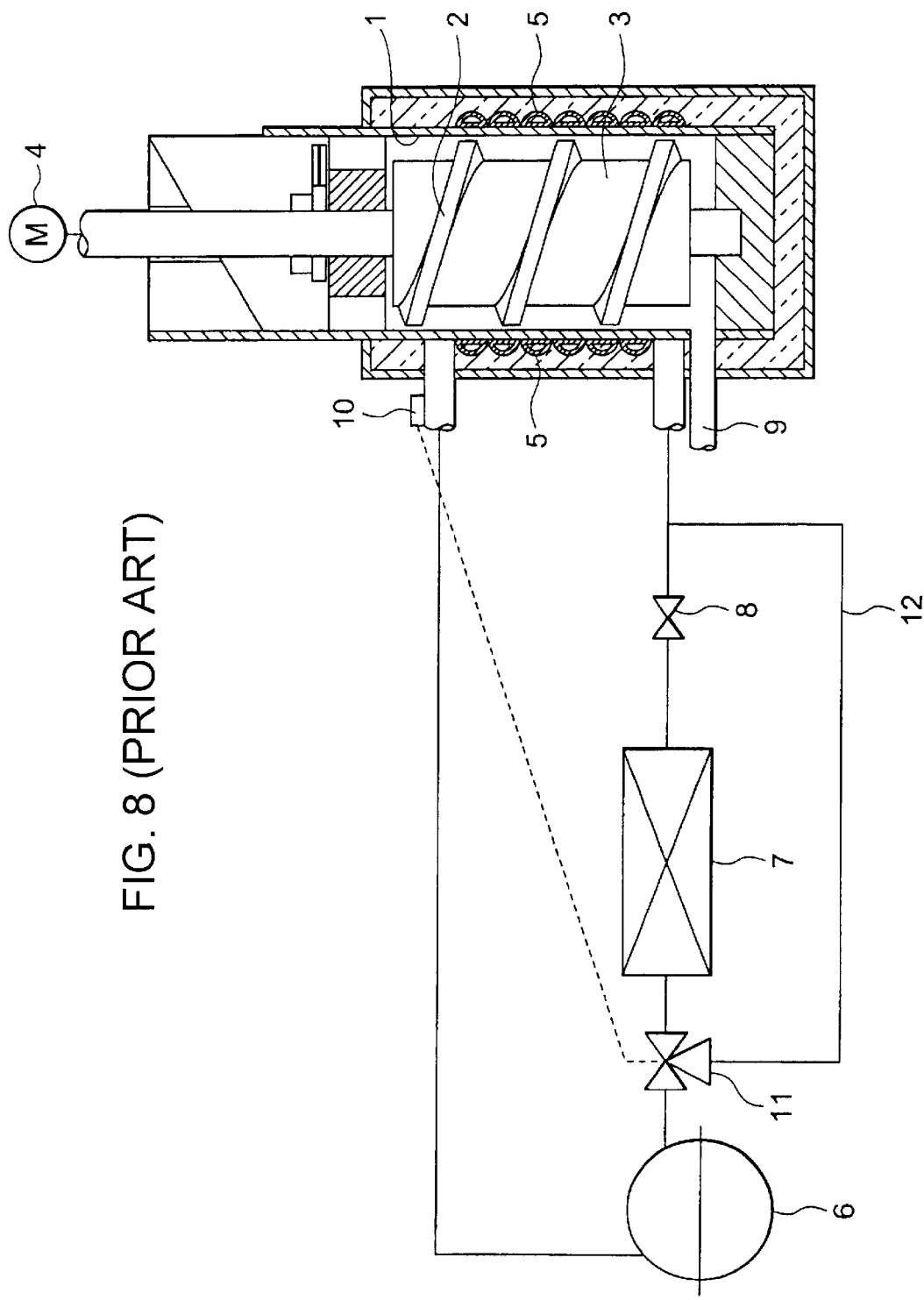
FIG. 8 is a view showing an overall construction of a conventional auger type ice making machine.
Figure 5:
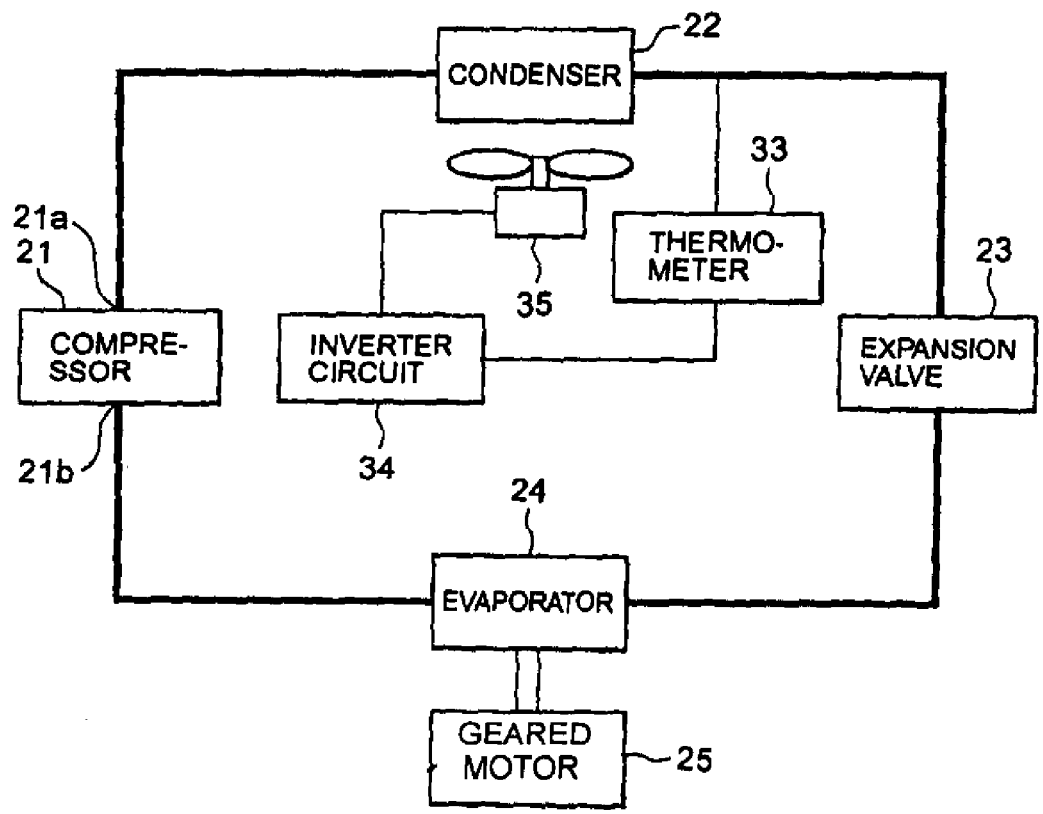

In Embodiment 7 of the present invention, the ammeter 29 used in Embodiment 1 of the invention is replaced by a thermometer 33 disposed as precursor detecting means on the refrigerant outlet side of a condenser 22. That is, as shown in FIG. 7, the thermometer 33 is disposed on the refrigerant outlet side of the condenser 22, and a temperature of refrigerant is detected by the thermometer 33 at all times. The thermometer 33 controls an electromagnetic valve 27 through a not-shown relay circuit. The electromagnetic valve 27 is disposed on a bypass passage 26 communicating a refrigerant outlet port 21a of the condenser 21 with a refrigerant inlet port 21b thereof. When opened, the electromagnetic valve 27 allows a high-pressure hot gas to be bypassed from the refrigerant outlet port 21a to the refrigerant inlet port 21b.

The outlet temperature of the condenser 22 is continuously detected to monitor whether or not there exists a precursor predictive of freeze-up in the evaporator 24. When an outlet temperature equal to or below a threshold is detected, this is seen as indicating a high probability of a freeze-up condition occurring in the evaporator 24. Therefore, the electromagnetic valve 27 is opened by means of a not-shown relay circuit to bypass a high-pressure hot gas on the outlet side of the compressor 21 to the inlet side of the compressor 21, thereby reducing refrigeration capacity of the refrigeration circuit. Accordingly, the evaporator 24 is guarded against excessive cooling, whereby a load imposed on the ice making machine is reduced to avoid locking of the geared motor 25 or the auger rotationally driven by the geared motor 25 at a relatively early stage.

An overload condition in the evaporator 24 can be detected before freeze-up occurs in the evaporator 24 by continuously detecting the outlet temperature of the condenser 22. Therefore, a load imposed on the ice making machine can be reduced as compared with a case where the machine operation is stopped after detecting a lock condition. Moreover, the above control can be performed without stopping the ice making machine, thus allowing a continuous ice making operation.

Incidentally, instead of the bypass passage 26, there may be provided a bypass passage that communicates the outlet side of the condenser 21 with the inlet side of the evaporator 24, whereby a high-pressure hot gas is bypassed to the inlet side of the evaporator 24 when an outlet temperature equal to or below a threshold value is detected.

It is to be noted that, in Embodiments 5 to 7 described above, a manometer may be used instead of the thermometer 33 that is disposed as precursor detecting means on the outlet side of the condenser 21. A precursor to the onset of freeze-up in the evaporator can be recognized in this case as well. A manometer detects a precursor to the onset of freeze-up by reading a pressure directly within a copper pipe that forms the refrigeration circuit. Therefore, the manometer has better responsiveness as compared with the thermometer that detects a temperature from outside the copper pipe, thus allowing a quicker response to be made. Also, a precursor to the onset of freeze-up in the evaporator 24 can be detected not only on the outlet side of the condenser but also on the basis of an outlet temperature or an outlet pressure of the evaporator; therefore, the thermometer 33 disposed as precursor detecting means on the refrigerant outlet side of the condenser 22 may be replaced by a thermometer or a manometer disposed on the refrigerant outlet side of the evaporator 24.

Note that the present invention is not limited to Embodiments described above. The ammeter, thermometer, and manometer as precursor detecting means, and the bypass passage, condenser fan, and inverter circuit as motor anti-locking means, which are described in aforementioned Embodiments, may be selectively combined as appropriate in implementing the present invention.

Other than for bypassing refrigerant from the outlet side of the compressor to the inlet side thereof, the bypass passage may be adapted in a wide variety of ways so as to bypass a hot gas on the high-pressure side of a refrigerant circuit to the low-pressure side.

The condenser capacity adjusting means is not limited to one that achieves its function by restraining or stopping a drive of the condenser fan. The condenser capacity adjusting means may take any other forms insofar as it is capable of reducing the condensation capacity of the condenser, such as disposing the electromagnetic valve on the inlet side of the condenser to reduce an amount of refrigerant flowing to the condenser.

Likewise, the compressor capacity adjusting means is not limited to one that restrains or stops a drive of the compressor in achieving its function. The compressor capacity adjusting means may take any other forms insofar as it is capable of reducing the compression capacity of the compressor, such as disposing the electromagnetic valve on the inlet side of the compressor to reduce an amount of refrigerant flowing to the compressor.

As described above, according to the present invention, a precursor to the onset of freeze-up in the evaporator is monitored at all times by the precursor detecting means. When the above precursor is detected, the ice making capacity of the ice making machine is progressively reduced in order to prevent locking of the geared motor without stopping the ice making operation.

What is claimed is:

1. An auger type ice making machine comprising:

a refrigeration circuit provided with a compressor, a condenser, an expansion valve, and an evaporator;

a cylinder having the evaporator wound around an outer peripheral surface thereof;

an auger rotatably mounted within the cylinder;

a motor for rotationally driving the auger;

precursor detecting means for detecting a precursor to locking of the motor occurring due to freeze-up in the evaporator; and a bypass passage for bypassing refrigerant on the high-pressure side of the refrigeration circuit to the low-pressure side, in a case where the precursor detecting means has detected the precursor to locking of the motor.

2. An auger type ice making machine according to claim 1, wherein the precursor detecting means determines that there exists a precursor to locking of the motor upon detecting one of the following:

a drive current of the motor becomes equal to or greater than a threshold;

one of an outlet temperature and an outlet pressure of the evaporator becomes equal to or lower than a threshold; and one of an outlet temperature and an outlet pressure of the condenser becomes equal to or lower than a threshold.

* * * * *

UNITED STATES PATENT AND TRADEMARK OFFICE
CERTIFICATE OF CORRECTION

PATENT NO.    : 6,694,752 B2
DATED         : February 24, 2004
INVENTOR(S)   : Tomohito Nomura et al.

It is certified that error appears in the above-identified patent and that said Letters Patent is hereby corrected as shown below:

Drawings
Figs. 5, 6 and 7, change the term "GEARD" to -- GEARED --.

Signed and Sealed this

Tenth Day of May, 2005

JON W. DUDAS
*Director of the United States Patent and Trademark Office*

UNITED STATES PATENT AND TRADEMARK OFFICE
CERTIFICATE OF CORRECTION

PATENT NO. : 6,694,752 B2
DATED : February 24, 2004
INVENTOR(S) : Tomohito Nomura et al.

It is certified that error appears in the above-identified patent and that said Letters Patent is hereby corrected as shown below:

Drawings,
Figs. 5, 6 and 7 change the term "GEARD" to -- GEARED --.

Column 1,
Line 8, change "evaporator" to -- cylinder --.

Column 2,
Lines 39, 53 and 66, change "evaporator" to -- cylinder --.

Column 4,
Lines 6 and 67, change "evaporator" to -- cylinder --.

Column 5,
Line 7, change "preformed" to -- performed --.
Line 44, change, "evaporator" to -- cylinder --.

Column 6,
Lines 26, 51, 58 and 64, change "evaporator" to -- cylinder --.

Column 7,
Lines 1-2, 12 and 31, change "evaporator" to -- cylinder --.

Column 8,
Lines 3, 33, 47 and 65, change "evaporator" to -- cylinder --.

Column 9,
Line 5, change "evaporator" to -- cylinder --.

UNITED STATES PATENT AND TRADEMARK OFFICE
CERTIFICATE OF CORRECTION

PATENT NO.     : 6,694,752 B2
DATED          : February 24, 2004
INVENTOR(S)    : Tomohito Nomura et al.

It is certified that error appears in the above-identified patent and that said Letters Patent is hereby corrected as shown below:

Column 10,
Lines 2 and 20, change "evaporator" to -- cylinder --.

Signed and Sealed this

Twentieth Day of December, 2005

JON W. DUDAS
*Director of the United States Patent and Trademark Office*